US009991103B2

(12) United States Patent
Brown

(10) Patent No.: US 9,991,103 B2
(45) Date of Patent: Jun. 5, 2018

(54) SELF-CALIBRATION OF SPECTRA USING PRECURSOR MASS TO CHARGE RATIO AND FRAGMENT MASS TO CHARGE RATIO KNOWN DIFFERENCES

(71) Applicant: MICROMASS UK LIMITED, Wilmslow (GB)

(72) Inventor: Jeffery Brown, Hyde (GB)

(73) Assignee: MICROMASS UK LIMITED, Wilmslow (GB)

( * ) Notice: Subject to any disclaimer, the term of this patent is extended or adjusted under 35 U.S.C. 154(b) by 0 days. days.

(21) Appl. No.: 15/305,502

(22) PCT Filed: Apr. 23, 2015

(86) PCT No.: PCT/GB2015/051195
§ 371 (c)(1),
(2) Date: Oct. 20, 2016

(87) PCT Pub. No.: WO2015/162426
PCT Pub. Date: Oct. 29, 2015

(65) Prior Publication Data

US 2017/0047208 A1 Feb. 16, 2017

(30) Foreign Application Priority Data

Apr. 23, 2014 (EP) .................................... 14165590
Apr. 23, 2014 (GB) .................................. 1407123.7

(51) Int. Cl.
*G01D 18/00* (2006.01)
*G12B 13/00* (2006.01)
*H01J 49/00* (2006.01)

(52) U.S. Cl.
CPC ...... *H01J 49/0009* (2013.01); *H01J 49/0072* (2013.01)

(58) Field of Classification Search
CPC ............. G01N 33/02; G01N 2800/044; G01N 2800/2871; G01N 2800/323; G01N 2800/324; H01J 49/64
See application file for complete search history.

(56) References Cited

U.S. PATENT DOCUMENTS 4,529,879 A * 7/1985 Schmit .................... H01J 49/04 250/281
5,300,771 A 4/1994 Labowsky
(Continued)

FOREIGN PATENT DOCUMENTS

GB 2435713 9/2007

OTHER PUBLICATIONS

Keller B O et al., "Interferences and Contaminants Encountered in Modern Mass Spectrometry", Analytica Chemica Acta. Elsevier, Amsterdam, NL, vol. 627, No. 1, p. 71-81, Oct. 2008.
(Continued)

*Primary Examiner* — Kiho Kim

(57) ABSTRACT

A method of checking or adjusting the calibration of a mass spectrometer is disclosed. The method comprises fragmenting parent or precursor ions and generating fragment or product ion mass spectral data and recognizing first neutral loss ions in the fragment or product ion mass spectral data. The method further comprises determining a first mass loss difference between the parent or precursor ions and the first neutral loss ions and determining whether the first mass loss difference corresponds with an expected or pre-determined mass loss difference, wherein if it is determined that the first mass loss difference does not correspond with an expected or pre-determined mass loss difference then the method further comprises adjusting one or more calibration parameters.

18 Claims, 1 Drawing Sheet

(56) References Cited

U.S. PATENT DOCUMENTS

| | | | |
|---|---|---|---|
| 6,498,340 B2 | 12/2002 | Anderson et al. | |
| 7,071,463 B2 | 7/2006 | Bowdler | |
| 7,138,624 B2 | 11/2006 | Kato | |
| 7,979,258 B2 | 7/2011 | Goldberg et al. | |
| 8,278,115 B2 | 10/2012 | Coon et al. | |
| 2002/0175279 A1* | 11/2002 | Hager | H01J 49/0095 250/281 |
| 2004/0026612 A1* | 2/2004 | Bateman | H01J 49/0045 250/281 |
| 2004/0063118 A1* | 4/2004 | Gross | G01N 33/92 435/6.11 |
| 2004/0183005 A1* | 9/2004 | Hager | H01J 49/4225 250/282 |
| 2004/0191916 A1* | 9/2004 | Gross | G01N 33/92 436/71 |
| 2005/0023454 A1 | 2/2005 | Bateman et al. | |
| 2005/0035286 A1* | 2/2005 | Bajic | H01J 49/168 250/288 |
| 2005/0214275 A1* | 9/2005 | Gross | A61K 31/20 424/94.6 |
| 2007/0148779 A1* | 6/2007 | Gross | G01N 33/92 436/71 |
| 2008/0201095 A1 | 8/2008 | Yip et al. | |
| 2008/0237458 A1 | 10/2008 | Wang | |
| 2009/0134325 A1* | 5/2009 | Goldman | G01N 33/6851 250/283 |
| 2009/0155766 A1* | 6/2009 | Goldman | G01N 33/6851 435/4 |
| 2014/0163902 A1* | 6/2014 | Yamaguchi | H01J 49/0036 702/28 |

OTHER PUBLICATIONS

A Fraefel et al., "Analysis of Doubly-Charged Ion Reactions and Consecutive Two-Step Degradation Processes by Means of Metastable Peak Mapping", International Journal of Mass Spectrometry and Ion Physics, vol. 51, No. 2-3, p. 245-254, Jul. 1983.

* cited by examiner

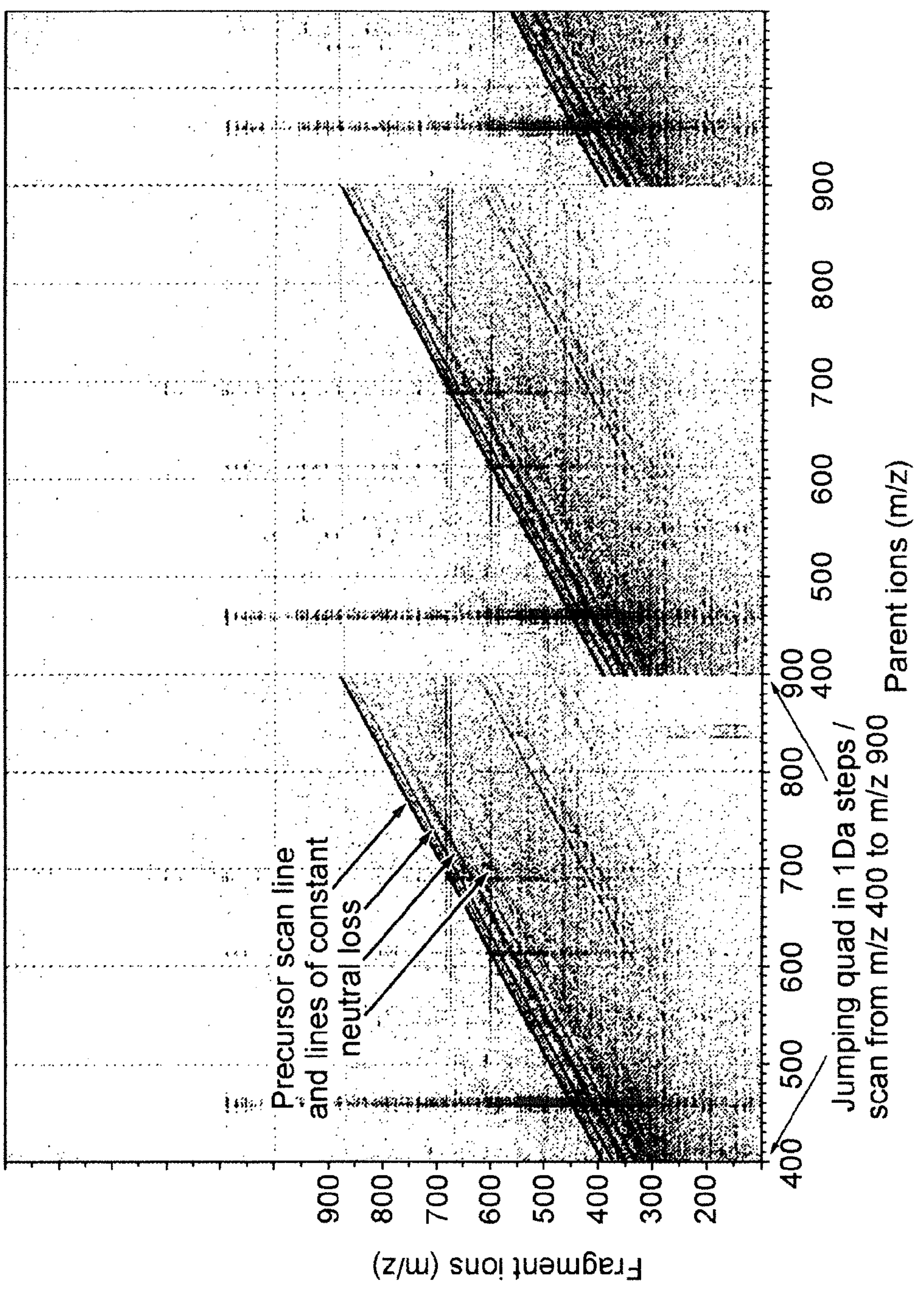
Precursor scan line
and lines of constant
neutral loss
Jumping quad in 1Da steps /
scan from m/z 400 to m/z 900
Parent ions (m/z)
Fragment ions (m/z)
400
500
600
700
800
900
200
300

SELF-CALIBRATION OF SPECTRA USING PRECURSOR MASS TO CHARGE RATIO AND FRAGMENT MASS TO CHARGE RATIO KNOWN DIFFERENCES

CROSS-REFERENCE TO RELATED APPLICATIONS

This application represents the U.S. National Phase of International Application No. PCT/GB2015/051195 entitled "Self-Calibration of Spectra Using Precursor Mass to Charge Ratio and Fragment Mass to Charge Ratio Known Differences" filed 23 Apr. 2015, which claims priority from and the benefit of United Kingdom patent application No. 1407123.7 filed on 23 Apr. 2014 and European patent application No. 14165590.2 filed on 23 Apr. 2014. The entire contents of these applications are incorporated herein by reference.

FIELD OF THE PRESENT INVENTION

The present invention relates generally to mass spectrometry and in particular to methods of checking or adjusting the calibration of mass spectrometers, methods of mass spectrometry and mass spectrometers.

BACKGROUND

It is known to perform mass to charge ratio scale calibration of a mass spectrometer by fitting data from known ion peaks by, for example, using a reference standard to the underlying scan law employed by a mass spectrometer. The underlying scan law employed by a mass spectrometer is typically a time of flight function.

It is known to carry out mass to charge ratio calibration before, during or after an acquisition of an unknown analyte.

Internal calibration refers to the addition of a known standard in to an analyte sample itself. However, known internal calibration techniques can be particularly problematic as the standard has to generate similar intensity ions to those of the unknown analyte in order to avoid saturation. Furthermore, the reference ions must have mass to charge ratios which are sufficiently different from the analyte ions in order to avoid interference.

External calibration or lock massing correction of a calibration relies on the stability of the system between the calibration time point and the analyte acquisition time point. However, this approach can be problematic especially if short term perturbations occur to the components within the system due, for example, to effects such as voltage or temperature drift or spikes.

External calibration or lock massing is also problematic and expensive as external calibration or lock massing typically requires a separate dedicated ionisation source. Furthermore, the mass spectrometer has to temporarily switch between the analyte ions and the reference ions which can result in a loss of analyte data.

US 2006/0136158 (Goldberg) discloses a method for recalibrating a mass spectrum of macromolecules or fragments. Information relating to molecules believed to be contained within the sample (such as, for example, information relating to the isotope envelope of molecules believed to be in the sample) is used to tentatively assign specific molecules to peaks in the spectrum. In the case of peptides, fragment peaks on the mass spectrum are difficult to label as belonging to specific sequences of amino acids due to combinations of amino acids having similar masses.

Therefore rather than assigning the fragment peaks themselves, mass differences between pairs of fragment ion peaks are determined and tentatively assigned to specific amino acids. Calibration parameters are then adjusted in order to reduce the difference between the measured mass to charge ratio values of the differences between peaks and their "true" values (i.e. the mass values of the corresponding tentatively-assigned molecule).

It is therefore desired to provide an improved method of calibrating or re-calibrating a mass spectrometer.

SUMMARY

According to an aspect there is provided a method of checking or adjusting the calibration of a mass spectrometer comprising:

fragmenting parent or precursor ions and generating fragment or product ion mass spectral data;

recognising first neutral loss ions in the fragment or product ion mass spectral data;

determining a first mass loss difference between the parent or precursor ions and the first neutral loss ions; and determining whether the first mass loss difference corresponds with an expected or pre-determined mass loss difference, wherein if it is determined that the first mass loss difference does not correspond with an expected or pre-determined mass loss difference then the method further comprises adjusting one or more calibration parameters.

Various embodiments are concerned with a method of self calibration of data.

It will be appreciated that the various embodiments are distinct from methods described in US 2006/0136158 (Goldberg) wherein pairs of fragment ions in the fragment ion mass spectral data are identified, the mass difference between the fragment ions in each pair are determined and tentatively assigned to particular molecules, and then the determined mass differences are compared to the expected mass differences of those particular molecules, since the various embodiments do not require recognising pairs of fragment ions. In the various embodiments, neutral loss ions (rather than pairs of fragment ions) are recognised in the fragment spectral data, and a mass loss difference between parent or precursor ions and the first neutral loss ions is determined. It is then determined whether this mass loss difference corresponds with an expected or pre-determined mass loss difference.

The step of fragmenting parent or precursor ions and generating fragment or product ion mass spectral data optionally comprises:

scanning a mass to charge ratio transmission window of a mass filter; and fragmenting parent or precursor ions which are transmitted by the mass filter.

The step of recognising first neutral loss ions in the fragment or product ion mass spectral data optionally comprises:

plotting or otherwise analysing the mass to charge ratio of fragment or product ions as a function of the mass to charge ratio of corresponding parent or precursor ions; and identifying one or more trend lines in the fragment or product ion mass spectral data.

The step of determining a first mass loss difference between the parent or precursor ions and the first neutral loss ions optionally comprises determining a line of best fit between the first neutral loss ions in the fragment or product ion mass spectral data.

The first neutral loss ions optionally comprise parent or precursor ions which have lost one or more neutral molecules or atoms.

According to an embodiment the one or more neutral molecules or atoms may comprise molecules or atoms selected from the group consisting of: (i) H; (ii) $CH_3$; (iii) OH; (iv) $H_2O$; (v) F; (vi) HF; (vii) $C_2H_3$, HCN; (viii) $C_2H_4$, CO; (ix) $CH_2O$; (x) $CH_3O$; (xi) $CH_4O$, S; (xii) $CH_3$+$H_2O$, HS; (xiii) $H_2S$; (xiv) Cl; (xv) HCl; (xvi) $C_3H_6$, $C_2H_2O$, $C_2H_4N$; (xvii) $C_3H_7$, $CH_3CO$; (xviii) $CO_2O$, $CONH_2$; (xix) $C_2H_5O$; (xx) $C_4H_7$; (xxi) $C_4H_6$; (xxii) $C_2H_3O_2$; (xxiii) $C_2H_4O_2$; (xxiv) $SO_2$; (xxv) Br; (xxvi) HBr; (xxvii) I; (xxviii) HI; (xxix) $NH_3$; (xxx) $CH_2$; (xxxi) $O_2$; (xxxii) $CO_2$; (xxxiii) $PO_2$; (xxxiv) $PO_3$; (xxxv) $HPO_3$; and (xxxvi) $H_3PO_4$.

The step of adjusting one or more calibration parameters optionally comprises adjusting the calibration of the mass spectrometer so that when the mass spectrometer has been re-calibrated the first mass loss difference exactly or substantially corresponds with an expected or pre-determined mass loss difference.

The step of adjusting one or more calibration parameters optionally comprises adjusting the calibration of the mass spectrometer so that when the mass spectrometer has been re-calibrated the difference between the first mass loss difference and an expected or pre-determined mass loss difference is reduced.

The method optionally further comprises:

recognising second neutral loss ions in the fragment or product ion mass spectral data;

determining a second mass loss difference between the parent or precursor ions and the second neutral loss ions; and determining whether the second mass loss difference corresponds with an expected or pre-determined mass loss difference, wherein if it is determined that the second mass loss difference does not correspond with an expected or pre-determined mass loss difference then the method further comprises adjusting one or more calibration parameters.

The method optionally further comprises:

recognising third neutral loss ions in the fragment or product ion mass spectral data;

determining a third mass loss difference between the parent or precursor ions and the third neutral loss ions; and determining whether the third mass loss difference corresponds with an expected or pre-determined mass loss difference, wherein if it is determined that the third mass loss difference does not correspond with an expected or pre-determined mass loss difference then the method further comprises adjusting one or more calibration parameters.

The method optionally further comprises:

recognising fourth neutral loss ions in the fragment or product ion mass spectral data;

determining a fourth mass loss difference between the parent or precursor ions and the fourth neutral loss ions; and determining whether the fourth mass loss difference corresponds with an expected or pre-determined mass loss difference, wherein if it is determined that the fourth mass loss difference does not correspond with an expected or pre-determined mass loss difference then the method further comprises adjusting one or more calibration parameters.

The step of fragmenting the parent or precursor ions optionally comprises fragmenting at least about 10, 20, 30, 40, 50, 60, 70, 80, 90, 100, 150, 200, 250, 300, 350, 400, 450, 500, 550, 600, 650, 700, 750, 800, 850, 900, 950 or 1000 different species of parent or precursor ions.

The method optionally further comprises generating at least about 10, 20, 30, 40, 50, 60, 70, 80, 90, 100, 150, 200, 250, 300, 350, 400, 450, 500, 550, 600, 650, 700, 750, 800, 850, 900, 950 or 1000 different parent or precursor ion and fragment or product ion pairs.

The method optionally further comprises:

recognising first adduct ions in said fragment or product ion mass spectral data;

determining a first mass gain difference between said parent or precursor ions and said first adduct ions; and determining whether said first mass gain difference corresponds with an expected or pre-determined mass gain difference, wherein if it is determined that said first mass gain difference does not correspond with an expected or pre-determined mass gain difference then said method further comprises adjusting one or more calibration parameters.

According to another aspect there is provided a method of checking or adjusting the calibration of a mass spectrometer comprising:

reacting parent or precursor ions and generating fragment or product ion mass spectral data;

recognising first adduct ions in said fragment or product ion mass spectral data;

determining a first mass gain difference between said parent or precursor ions and said first adduct ions; and determining whether said first mass gain difference corresponds with an expected or pre-determined mass gain difference, wherein if it is determined that said first mass gain difference does not correspond with an expected or pre-determined mass gain difference then said method further comprises adjusting one or more calibration parameters.

The step of reacting parent or precursor ions and generating fragment or product ion mass spectral data optionally comprises:

scanning a mass to charge ratio transmission window of a mass filter; and reacting parent or precursor ions which are transmitted by said mass filter.

The step of recognising first adduct ions in said fragment or product ion mass spectral data optionally comprises:

plotting or otherwise analysing the mass to charge ratio of fragment or product ions as a function of the mass to charge ratio of corresponding parent or precursor ions; and identifying one or more trend lines in said fragment or product ion mass spectral data.

The step of determining a first mass gain difference between said parent or precursor ions and said first adduct ions optionally comprises determining a line of best fit between said first adduct ions in said fragment or product ion mass spectral data.

The step of adjusting one or more calibration parameters optionally comprises adjusting the calibration of said mass spectrometer so that when said mass spectrometer has been re-calibrated said first mass gain difference exactly or substantially corresponds with an expected or pre-determined mass gain difference.

The step of adjusting one or more calibration parameters optionally comprises adjusting the calibration of said mass spectrometer so that when said mass spectrometer has been re-calibrated the difference between said first mass gain difference and an expected or pre-determined mass gain difference is reduced.

The method optionally further comprises:

recognising second adduct ions in said fragment or product ion mass spectral data;

determining a second mass gain difference between said parent or precursor ions and said second adduct ions; and determining whether said second mass gain difference corresponds with an expected or pre-determined mass gain difference, wherein if it is determined that said second mass gain difference does not correspond with an expected or pre-determined mass gain difference then said method further comprises adjusting one or more calibration parameters.

The method optionally further comprises:

recognising third adduct ions in said fragment or product ion mass spectral data;

determining a third mass gain difference between said parent or precursor ions and said third adduct ions; and determining whether said third mass gain difference corresponds with an expected or pre-determined mass gain difference, wherein if it is determined that said third mass gain difference does not correspond with an expected or pre-determined mass gain difference then said method further comprises adjusting one or more calibration parameters.

The method optionally further comprises:

recognising fourth adduct ions in said fragment or product ion mass spectral data;

determining a fourth mass gain difference between said parent or precursor ions and said fourth adduct ions; and determining whether said fourth mass gain difference corresponds with an expected or pre-determined mass gain difference, wherein if it is determined that said fourth mass gain difference does not correspond with an expected or pre-determined mass gain difference then said method further comprises adjusting one or more calibration parameters.

According to another aspect there is provided a method of mass spectrometry comprising a method as described above.

According to another aspect there is provided a mass spectrometer comprising:

a fragmentation device for fragmenting ions; and a control system arranged and adapted:

(i) to fragment parent or precursor ions and to generate fragment or product ion mass spectral data;

(ii) to recognise first neutral loss ions in the fragment or product ion mass spectral data;

(iii) to determine a first mass loss difference between the parent or precursor ions and the first neutral loss ions; and (iv) to determine whether the first mass loss difference corresponds with an expected or pre-determined mass loss difference, wherein if the control system determines that the first mass loss difference does not correspond with an expected or pre-determined mass loss difference then the control system is further arranged and adapted to adjust one or more calibration parameters.

According to another aspect there is provided a mass spectrometer comprising:

a fragmentation device for fragmenting ions; and a control system arranged and adapted:

(i) to fragment parent or precursor ions and to generate fragment or product ion mass spectral data;

(ii) to recognise first adduct ions in said fragment or product ion mass spectral data;

(iii) to determine a first mass gain difference between said parent or precursor ions and said first adduct ions; and (iv) to determine whether said first mass gain difference corresponds with an expected or pre-determined mass gain difference, wherein if said control system determines said first mass gain difference does not correspond with an expected or pre-determined mass gain difference then said control system is further arranged and adapted to adjust one or more calibration parameters.

According to another aspect there is provided a method of ionising a known class of compound for analysis by MS/MS comprising:

(i) identifying a multiplicity of characteristic constant neutral loss peaks and measuring the neutral loss differences within the MS/MS data; and (ii) utilising the values from a multiplicity of peaks to improve mass to charge ratio calibration.

According to the embodiment the preferred method further comprises:

(i) scanning a precursor ion with a first mass filter, sequentially fragmenting a multiplicity of the precursor ions to generate mass to charge ratio data recorded by a second mass analyser;

(ii) plotting fragment mass to charge ratio versus precursor mass to charge ratio;

(iii) applying an automated algorithm to determine the lines of best fit corresponding to known neutral losses from precursors of the class of compound and subtracting the lines of best fit to obtain statistically valid measurements of the apparent neutral losses; and (iv) comparing the apparent neutral loss mass to charge ratio with the known expected mass to charge ratio value and correcting and/or re-calibrating the whole mass to charge ratio scale based on the error function measured.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

According to an embodiment analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to an embodiment the process of Electron Transfer Dissociation fragmentation comprises interacting analyte ions with reagent ions, wherein the reagent ions comprise dicyanobenzene, 4-nitrotoluene or azulene.

BRIEF DESCRIPTION OF THE DRAWINGS

Various embodiments will now be described, by way of example only, and with reference to the accompanying drawing in which:

FIG. 1 shows a heat map showing a parent or precursor scan line and trend lines relating to constant neutral loss ions.

DETAILED DESCRIPTION

An embodiment will now be described.

An embodiment utilises the fact that ions of certain classes of compounds (e.g. peptides) when subjected to fragmentation will result in fragment or product ions wherein some of the fragment or product ions are neutral loss ions wherein the ions have lost one or more neutral molecules or atoms (e.g. water). The neutral loss ions should have a precise mass difference from that of the parent ions. The embodiment recognises neutral loss ions in fragmentation mass spectral data and uses the mass difference between the neutral loss ions and the parent ions to self calibrate the mass to charge ratio scale of a mass spectrometer.

According to an embodiment ions from an ion source such as an Electrospray Ionisation ("ESI") ion source are passed to a quadrupole mass filter. The quadrupole mass filter is optionally set to transmit a 1 Da mass range of parent or precursor ions at any particular point in time. The mass to charge ratio transmission window of the quadrupole mass filter is optionally scanned. For example, according to an embodiment the mass to charge ratio transmission window may be progressively scanned from a mass to charge ratio of 400 to a mass to charge ratio of 900 in steps of 1 Da.

Once the quadrupole mass filter has transmitted ions having a mass to charge ratio of 900 the quadrupole mass filter is then optionally reset so as to return to transmitting ions having a mass to charge ratio of 400 and the scan process is then optionally repeated one or more times.

Parent or precursor ions which are transmitted by the quadrupole mass filter are optionally fragmented in a fragmentation cell or device. According to an embodiment the fragmentation cell or device may comprise a Collision Induced Dissociation ("CID") fragmentation cell or device. However, according to other embodiments the fragmentation cell or device may comprise an Electron Transfer Dissociation ("ETD") device or another form of fragmentation cell or device.

The parent or precursor ions which are fragmented or otherwise dissociated in the fragmentation cell or device are optionally fragmented so as to result in a plurality of fragment or product ions. The resulting fragment or product ions are then mass analysed by, for example, a Time of Flight mass analyser. Some of the resulting fragment or product ions optionally comprise neutral loss ions i.e. parent or precursor ions which have lost one or more neutral molecules or atoms. For example, peptide ions may lose a water molecule and the resulting dehydrated neutral loss ions will have a mass to charge ratio which is 18 Da less than that of the parent peptide ion.

Dehydration of peptides is often observed with a corresponding peak observed at 18 mass units lower than the mass to charge ratio of the parent or precursor ion. FIG. 1 shows results following Electrospray Ionisation ("ESI") of the neuropeptide Substance P. The peptide ions ionised by the Electrospray Ionisation ion source were transmitted to a quadrupole mass filter. The quadrupole mass filter was progressively scanned in 1 Da steps and the transmitted parent or precursor ions at each setting of the quadrupole mass filter were fragmented in a Collision Induced Dissociation ("CID") fragmentation device. The resulting fragment or product ions were then mass analysed.

FIG. 1 shows the mass to charge ratio of the fragment or product ions plotted as function of the scan time of the quadrupole mass filter. It will be understood that the scan time of the quadrupole mass filter corresponds with the mass to charge ratio of the parent or precursor ions which were transmitted by the quadrupole mass filter. Accordingly, FIG. 1 may be considered as showing along the x-axis the mass to charge ratio of parent or precursor ions which were transmitted at any instance in time by the quadrupole mass filter and wherein the y-axis shows the mass to charge ratio of the resulting fragment or product ions.

It is known that singly charged Substance P ions have a mass to charge ratio of 1347.7, doubly charged Substance P ions have a mass to charge ratio of 674.4 and triply charged Substance P ions have a mass to charge ratio of 449.9.

FIG. 1 shows a vertical line around mass to charge ratio 450 which corresponds with fragment or product ions resulting from the fragmentation of triply charged Substance P ions.

A particularly important feature of the embodiment is that it is apparent from FIG. 1 that various trend lines may be observed in the fragmentation mass spectral data.

In the particular example shown in FIG. 1 a parent or precursor ion scan line is indicated and three further trend lines are indicated below the parent or precursor ion scan line. The parent or precursor ion scan line shows that as the parent or precursor ions were scanned from 400 to 900 Da, unfragmented ions having the same mass to charge ratio were observed in the fragmentation ion mass spectral data.

The three further trend lines indicated in FIG. 1 (which appear below the parent or precursor ion scan line) are particularly important.

One of the highlighted trend lines corresponds with Substance P ions which have become dehydrated (i.e. have lost a water molecule). The dehydrated peptide ions are neutral loss ions and the mass to charge ratio of the neutral loss ions should be 18 Da less than the mass to charge ratio of the corresponding hydrated parent or precursor peptide ions.

The various trend lines which are observed in FIG. 1 correspond to common neutral losses from parent or precursor peptide ions.

It is apparent from FIG. 1 that ion peaks are observed effectively at every parent or precursor ion mass to charge ratio value. The ion peaks are mostly of unknown structure but will be related to the class of compound (e.g. peptides) being analysed. For example, the ions may comprise non-specific peptides, clusters, adducts, modifications, fragments, or ions resulting from partial digestion etc.

It is possible to extract accurate values for the neutral losses observed by applying best fit lines to the mass spectral data. According to the embodiment if the neutral loss value is, for example, 5 ppm too high compared with a pre-determined or expected mass loss then the mass spectral data set may be corrected by 5 ppm in order to obtain more accurate values for the unknown ions. According to the embodiment one or more calibration parameters may be adjusted so that when the mass spectrometer has been re-calibrated the neutral loss ions have a mass difference which optionally exactly matches a pre-determined or expected mass difference.

It is apparent then the approach according to the embodiment is not possible with just a few data points due to the small error values in mass to charge ratio differences. However, utilising a full mass spectral data set which may comprise tens or hundreds of parent or precursor ion and fragment ion pairs in a manner as described above significantly improves the statistical accuracy of the measurement process. Accordingly, having acquired sufficient mass spectral data, the control system of the mass spectrometer may then accurately self-calibrate the mass spectrometer or otherwise perform an accurate process of calibrating or re-calibrating the mass spectrometer using essentially an internal calibration method as described above.

Various further embodiments are contemplated wherein the mass spectrometer may be operated in a mode of operation so as to obtain Hi-Lo acquisitions. For example, in this mode of operation a collision cell or fragmentation device may be repeatedly switched between a first mode of operation wherein parent or precursor ions are transmitted without being fragmented within the collision cell or fragmentation device and a second mode of operation wherein parent or precursor ions are fragmented within the collision cell or fragmentation device. In the first mode of operation parent or precursor ions may be transmitted through the collision cell or fragmentation device but the collision cell or fragmentation device may be essentially switched OFF so that the collision cell or fragmentation device acts as an ion guide so as to onwardly transmit ions without substantially fragmenting the ions. Alternatively, in the first mode of operation parent or precursor ions may be directed so as to substantially by-pass the collision cell or fragmentation device.

According to a similar mode of operation the mass spectrometer may be operated in a $MS^e$ mode of operation. Data Independent Analysis ("DIA" or $MS^e$) involves switching the collision energy between low energy and high energy in order to produce precursor and product ion spectra. However, if a complex sample is analysed then there may be co-eluting parent ions for which retention time alignment by itself is inadequate to deconvolve the $MS^e$ spectra. An ion mobility separation stage may be introduced prior to the fragmentation device so that both retention time and ion mobility elution time may be used to assign parent or precursor ion mass spectral data to corresponding product ion mass spectral data. This approach is known as $HDMS^e$. The self-calibration approach as described above may be used to calibrate or re-calibrate a mass spectrometer which is operated in a $MS^e$ or $HDMS^e$ mode of operation.

Parent or precursor ions may lose neutral molecules or neutral atoms and hence may suffer from neutral loss. The following table details a number of common ways in which parent or precursor ions may suffer from neutral loss.

| Monoisotopic mass loss (amu) | Composition |
|---|---|
| 1.007825 | H |
| 14.01565008 | $CH_2$ |
| 15.023475 | $CH_3$ |
| 15.99491463 | O |
| 17.00273967 | OH |
| 17.02654912 | $NH_3$ |
| 18.01056471 | $H_2O$ |
| ~19 | F |
| ~20 | HF |
| 21.98194 | $Na^+$ replaced by $H^+$ |
| 27.01089904 | HCN |
| 27.02347512 | $C_2H_3$ |
| 27.99491463 | CO |
| 38.03130016 | $C_2H_4$ |
| 30.01056471 | $CH_2O$ |
| 31.01838975 | $CH_3O$ |
| 32.02621479 | $CH_4O$ |
| 31.97207 | S |
| 31.98983 | $O_2$ |
| 32.97989573 | HS |
| ~33 | $CH_3 + H_2O$, |
| 33.98772077 | $H_2S$ |
| 34.968853(37) | Cl |
| 35.97667804(38) | HCl |
| 42.04695024 | $C_3H_6$ |

-continued

| Monoisotopic mass loss (amu) | Composition |
|---|---|
| 42.01056471 | $C_2H_2O$ |
| 42.03437416 | $C_2H_4N$ |
| 43.05477528 | $C_3H_7$ |
| ~43 | $CH_3CO$ |
| 43.98982926 | $CO_2$ |
| 44.01363871 | $CONH_2$ |
| ~45 | $C_2H_5O$ |
| ~55 | $C_4H_7$ |
| ~57 | $C_4H_9$ |
| ~59 | $C_2H_3O_2$ |
| ~60 | $C_2H_4O_2$ |
| 62.96359077 | $PO_2$ |
| 63.96189995 | $SO_2$ |
| 78.9585054 | $PO_3$ |
| 79.96633044 | $HPO_3$ |
| ~79(81) | Br |
| ~80(82) | HBr |
| 97.97689515 | $H_3PO_4$ |
| ~127 | I |
| ~128 | HI |

Embodiments are contemplated wherein one or more mass losses (as exemplified in the table above) may be utilised in order to self-calibrate the mass spectrometer. However, the present embodiments are not restricted to the specific mass loses as detailed above and further embodiments are contemplated wherein different mass loses may be used to self-calibrate the mass spectrometer.

Further embodiments are contemplated wherein adduct ions are utilised along with, or instead of, neutral loss ions in order to self-calibrate the mass spectrometer. These various embodiments utilise the fact that when ions of certain classes of compounds are reacted they may result in product ions wherein some of the product ions are adduct ions wherein the ions have gained one or more atoms or molecules. Like neutral loss ions, the adduct ions should have a precise mass difference from that of the precursor ions. In these various embodiments, one or more calibration parameters may be adjusted so that when the mass spectrometer has been re-calibrated the adduct ions have a mass difference which optionally exactly matches the pre-determined or expected mass difference.

"Interferences and contaminants encountered in modern mass spectrometry", Bernd O. Keller, Jie Sui, Alex B. Young and Randy M. Whittal Analytica Chimica Acta 627, Issue 1, 3 Oct. 2008, Pages 71-81, details a number of common ways in which parent or precursor ions may undergo adducts, losses or replacements, and the corresponding precise (expected) mass differences for these reactions. Each or any of these expected mass differences may, as will be understood by those skilled in the art, be utilised in accordance with the methods described herein in order to self-calibrate a mass spectrometer.

Although the present invention has been described with reference to embodiments, it will be understood by those skilled in the art that various changes in form and detail may be made without departing from the scope of the invention as set forth in the accompanying claims.

The invention claimed is:

1. A method of checking or adjusting the calibration of a mass spectrometer comprising:

fragmenting parent or precursor ions and generating fragment or product ion mass spectral data;

recognising first neutral loss ions in said fragment or product ion mass spectral data;

determining a first mass loss difference between said parent or precursor ions and said first neutral loss ions;

determining whether said first mass loss difference corresponds with an expected or pre-determined mass loss difference, wherein if it is determined that said first mass loss difference does not correspond with an expected or pre-determined mass loss difference then said method further comprises adjusting one or more calibration parameters; and wherein said step of fragmenting parent or precursor ions and generating fragment or product ion mass spectral data comprises:

scanning a mass to charge ratio transmission window of a mass filter; and fragmenting parent or precursor ions which are transmitted by said mass filter.

2. A method as claimed in claim 1, wherein said step of recognising first neutral loss ions in said fragment or product ion mass spectral data comprises:

plotting or otherwise analysing the mass to charge ratio of fragment or product ions as a function of the mass to charge ratio of corresponding parent or precursor ions; and identifying one or more trend lines in said fragment or product ion mass spectral data; and wherein said step of determining a first mass loss difference between said parent or precursor ions and said first neutral loss ions comprises determining a line of best fit between said first neutral loss ions in said fragment or product ion mass spectral data.

3. A method as claimed in claim 1, wherein said first neutral loss ions comprise parent or precursor ions which have lost one or more neutral molecules or atoms; wherein said one or more neutral molecules or atoms are selected from the group consisting of: (i) H; (ii) CH3; (iii) OH; (iv) H2O; (v) F; (vi) HF; (vii) C2H3, HCN; (viii) C2H4, CO; (ix) CH2O; (x) CH3O; (xi) CH4O, S; (xii) CH3+H2O, HS; (xiii) H2S; (xiv) Cl; (xv) HCl; (xvi) C3H6, C2H2O, C2H4N; (xvii) C3H7, CH3CO; (xviii) CO2O, CONH2; (xix) C2H5O; (xx) C4H7; (xxi) C4H9; (xxii) C2H3O2; (xxiii) C2H4O2; (xxiv) SO2; (xxv) Br; (xxvi) HBr; (xxvii) I; (xxviii) HI; (xxix) $NH_3$; (xxx) $CH_2$; (xxxi) $O_2$; (xxxii) $CO_2$; (xxxiii) $PO_2$; (xxxiv) $PO_3$; (xxxv) $HPO_3$; and (xxxvi) $H_3PO_4$.

4. A method as claimed in claim 1, wherein the step of adjusting one or more calibration parameters comprises:

adjusting the calibration of said mass spectrometer so that when said mass spectrometer has been re-calibrated said first mass loss difference exactly or substantially corresponds with an expected or pre-determined mass loss difference; or adjusting the calibration of said mass spectrometer so that when said mass spectrometer has been re-calibrated the difference between said first mass loss difference and an expected or pre-determined mass loss difference is reduced.

5. A method as claimed in claim 1, further comprising:

recognising second neutral loss ions in said fragment or product ion mass spectral data;

determining a second mass loss difference between said parent or precursor ions and said second neutral loss ions; and determining whether said second mass loss difference corresponds with an expected or pre-determined mass loss difference, wherein if it is determined that said second mass loss difference does not correspond with an expected or pre-determined mass loss difference then said method further comprises adjusting one or more calibration parameters.

6. A method as claimed in claim 1, further comprising:

recognising third neutral loss ions in said fragment or product ion mass spectral data;

determining a third mass loss difference between said parent or precursor ions and said third neutral loss ions; and determining whether said third mass loss difference corresponds with an expected or pre-determined mass loss difference, wherein if it is determined that said third mass loss difference does not correspond with an expected or pre-determined mass loss difference then said method further comprises adjusting one or more calibration parameters.

7. A method as claimed in claim 1, further comprising:

recognising fourth neutral loss ions in said fragment or product ion mass spectral data;

determining a fourth mass loss difference between said parent or precursor ions and said fourth neutral loss ions; and determining whether said fourth mass loss difference corresponds with an expected or pre-determined mass loss difference, wherein if it is determined that said fourth mass loss difference does not correspond with an expected or pre-determined mass loss difference then said method further comprises adjusting one or more calibration parameters.

8. A method as claimed in claim 1, wherein the step of fragmenting said parent or precursor ions comprises fragmenting at least 10, 20, 30, 40, 50, 60, 70, 80, 90, 100, 150, 200, 250, 300, 350, 400, 450, 500, 550, 600, 650, 700, 750, 800, 850, 900, 950 or 1000 different species of parent or precursor ions.

9. A method as claimed in claim 1, further comprising generating at least 10, 20, 30, 40, 50, 60, 70, 80, 90, 100, 150, 200, 250, 300, 350, 400, 450, 500, 550, 600, 650, 700, 750, 800, 850, 900, 950 or 1000 different parent or precursor ion and fragment or product ion pairs.

10. A method as claimed in claim 1, further comprising:

recognising first adduct ions in said fragment or product ion mass spectral data;

determining a first mass gain difference between said parent or precursor ions and said first adduct ions; and determining whether said first mass gain difference corresponds with an expected or pre-determined mass gain difference, wherein if it is determined that said first mass gain difference does not correspond with an expected or pre-determined mass gain difference then said method further comprises adjusting one or more calibration parameters.

11. A method of mass spectrometry comprising a method as claimed in claim 1.

12. A method of checking or adjusting the calibration of a mass spectrometer comprising:

reacting parent or precursor ions and generating fragment or product ion mass spectral data;

recognising first adduct ions in said fragment or product ion mass spectral data;

determining a first mass gain difference between said parent or precursor ions and said first adduct ions;

determining whether said first mass gain difference corresponds with an expected or pre-determined mass gain difference, wherein if it is determined that said first mass gain difference does not correspond with an expected or pre-determined mass gain difference then said method further comprises adjusting one or more calibration parameters; and wherein said step of reacting parent or precursor ions and generating fragment or product ion mass spectral data comprises:

scanning a mass to charge ratio transmission window of a mass filter; and reacting parent or precursor ions which are transmitted by said mass filter.

13. A method as claimed in claim 12, wherein said step of recognising first adduct ions in said fragment or product ion mass spectral data comprises:

plotting or otherwise analysing the mass to charge ratio of fragment or product ions as a function of the mass to charge ratio of corresponding parent or precursor ions; and identifying one or more trend lines in said fragment or product ion mass spectral data; and wherein said step of determining a first mass gain difference between said parent or precursor ions and said first adduct ions comprises determining a line of best fit between said first adduct ions in said fragment or product ion mass spectral data.

14. A method as claimed in claim 12, wherein the step of adjusting one or more calibration parameters comprises:

adjusting the calibration of said mass spectrometer so that when said mass spectrometer has been re-calibrated said first mass gain difference exactly or substantially corresponds with an expected or pre-determined mass gain difference; or adjusting the calibration of said mass spectrometer so that when said mass spectrometer has been re-calibrated the difference between said first mass gain difference and an expected or pre-determined mass gain difference is reduced.

15. A method as claimed in any of claim 12, further comprising:

recognising second adduct ions in said fragment or product ion mass spectral data;

determining a second mass gain difference between said parent or precursor ions and said second adduct ions; and determining whether said second mass gain difference corresponds with an expected or pre-determined mass gain difference, wherein if it is determined that said second mass gain difference does not correspond with an expected or pre-determined mass gain difference then said method further comprises adjusting one or more calibration parameters.

16. A method as claimed in any of claim 12, further comprising:

recognising third adduct ions in said fragment or product ion mass spectral data;

determining a third mass gain difference between said parent or precursor ions and said third adduct ions; and determining whether said third mass gain difference corresponds with an expected or pre-determined mass gain difference, wherein if it is determined that said third mass gain difference does not correspond with an expected or pre-determined mass gain difference then said method further comprises adjusting one or more calibration parameters.

17. A method as claimed in claim 12, further comprising:

recognising fourth adduct ions in said fragment or product ion mass spectral data;

determining a fourth mass gain difference between said parent or precursor ions and said fourth adduct ions; and determining whether said fourth mass gain difference corresponds with an expected or pre-determined mass gain difference, wherein if it is determined that said fourth mass gain difference does not correspond with an expected or pre-determined mass gain difference then said method further comprises adjusting one or more calibration parameters.

18. A mass spectrometer comprising:

a fragmentation device for fragmenting ions; and a control system arranged and adapted:

(i) to fragment parent or precursor ions and to generate fragment or product ion mass spectral data by scanning a mass to charge ratio transmission window of a mass filter and fragmenting parent or precursor ions which are transmitted by said mass filter;

(ii) to recognise first neutral loss ions or first adduct ions in said fragment or product ion mass spectral data;

(iii) to determine a first mass loss difference between said parent or precursor ions and said first neutral loss ions or determine a first mass gain difference between said parent or precursor ions and said first adduct ions; and (iv) to determine whether said first mass loss difference or said first mass gain difference corresponds with an expected or pre-determined mass loss difference or with an expected or predetermined mass gain difference, wherein if said control system determines said first mass loss difference or said first mass gain difference does not correspond with said expected or predetermined mass loss difference or said expected or predetermined mass gain difference then said control system is further arranged and adapted to adjust one or more calibration parameters.

* * * * *